(12) United States Patent
Fujimoto et al.

(10) Patent No.: US 6,497,397 B2
(45) Date of Patent: Dec. 24, 2002

(54) SEAT SLIDE APPARATUS (75) Inventors: Ryo Fujimoto, Kanagawa-ken (JP);
Tomonori Yoshida, Kanagawa-ken (JP)

(73) Assignee: Johnson Controls Automotive Systems Corporation, Kanagawa-ken (JP)

( * ) Notice: Subject to any disclaimer, the term of this patent is extended or adjusted under 35 U.S.C. 154(b) by 0 days.

(21) Appl. No.: 10/011,179

(22) Filed: Nov. 8, 2001

(65) Prior Publication Data
US 2002/0056799 A1 May 16, 2002

(30) Foreign Application Priority Data

Nov. 16, 2000 (JP) ....................... 2000-349635
Feb. 7, 2001 (JP) ....................... 2001-030660

(51) Int. Cl.$^7$ ............................................. F16M 13/00
(52) U.S. Cl. .................................................... 248/430
(58) Field of Search ................................ 248/430, 429, 248/424, 423; 296/64, 65.1, 68.1; 297/344.1, 463.1

(56) References Cited

U.S. PATENT DOCUMENTS

| 4,828,214 A | * | 5/1989 | Kanai et al. ............... 248/430 |
| 4,940,285 A | * | 7/1990 | Suzuki et al. ............. 297/493 |
| 5,176,353 A | * | 1/1993 | Aihara et al. ............. 248/430 |
| 5,183,234 A | * | 2/1993 | Saito ......................... 248/430 |
| 5,192,045 A | * | 3/1993 | Yamada et al. ............ 248/430 |
| 5,213,300 A |   | 5/1993 | Rees |
| 5,447,352 A | * | 9/1995 | Ito et al. .................... 296/65.1 |
| 5,529,397 A | * | 6/1996 | Yoshida ..................... 384/47 |
| 6,089,521 A | * | 7/2000 | Tarusawa et al. .......... 248/430 |
| 6,152,415 A | * | 11/2000 | Seki et al. ................. 248/430 |
| 6,170,790 B1 | * | 1/2001 | Schuler et al. ............ 248/430 |
| 6,286,799 B1 | * | 9/2001 | Fujii .......................... 248/430 |
| 2001/0013570 A1 | * | 8/2001 | Yoshida et al. ............ 248/429 |

FOREIGN PATENT DOCUMENTS

| DE | 39 18 424 A1 | 12/1990 |
| EP | 0 421 300 A2 | 4/1991 |
| EP | 1 116 624 A2 | 7/2001 |
| JP | 07-276936 | 4/1995 |

OTHER PUBLICATIONS

European Patent Search Report Dated Mar. 8, 2002.

* cited by examiner

Primary Examiner—Ramon O. Ramirez
Assistant Examiner—Kofi Schulterbrandt
(74) Attorney, Agent, or Firm—Foley & Lardner (57) ABSTRACT

First hook portions (15) are formed at front end portions in a side of an opening portion (12e) of a main body portion (12a) in a long lower rail (12), and second hook portions (17) are formed in lower portions of both side portions (12b) in the main body portion (12a). First engagement portions (18) engaged with the first hook portions (15) in the long lower rail (12) are formed in upper walls (13d) in an upper rail (13). Projection portions (18a) are formed in the first engagement portions (18) so as to protrude to the side of the first hook portions (15). Second engagement portions (19) engaged with the second hook portions (17) in the long lower rail (12) are formed in front end sides of both side portions (13b) of the main body portion (13a) in the upper rail (13).

13 Claims, 6 Drawing Sheets

SEAT SLIDE APPARATUS

BACKGROUND OF THE INVENTION

1. Field of the Invention

The present invention relates to a seat slide apparatus, and more particularly to a seat slide apparatus comprising a lower rail mounted in a longitudinal direction of a floor surface for mounting a seat and an upper rail guided and supported on the lower rail so as to freely slide in a longitudinal direction and mounted to a side of a seat main body.

2. Description of the Related Art

In general, a seat for a vehicle is provided with a seat main body constituted by a seat cushion, a seat back stood at the back thereof so as to be freely rotated and adjusted, and the like, and supports the seat cushion or the like constituting the seat main body on the vehicle body floor surface via a longitudinal slide mechanism, thereby being structured such as to be adjusted so as to freely slide in a longitudinal direction of the vehicle body and being formed so as to variously modify a layout of the seat within a passenger's room.

Further, as a longitudinal slide mechanism for the seat mentioned above, there is employed a seat slide apparatus which is formed to be long in the longitudinal direction on the vehicle body floor surface, is mounted on the vehicle body floor surface and is constituted by a lower rail provided substantially in the same height as that of a surface of a floor carpet and an upper rail mounted to the seat main body. Further, as described in Japanese Unexamined Patent Publication No. 9-95163, there is disclosed a structure in which a lock member is provided in the upper rail and the lower rail so as to adjust a sliding operation.

Figure 1:
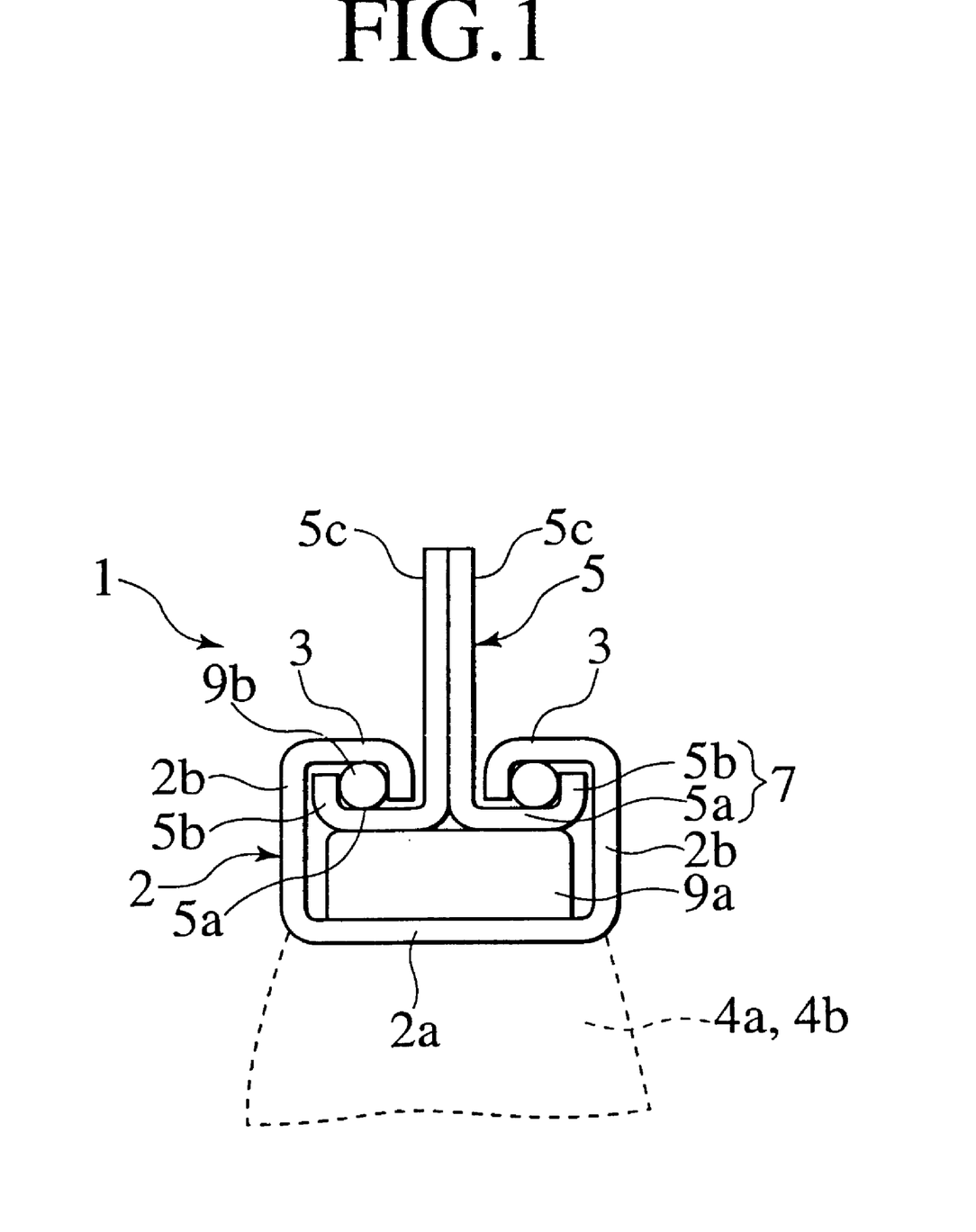
FIG. 1 is a schematic cross sectional view of a conventional seat slide apparatus.

As shown in FIG. 1, in a conventional seat slide apparatus 1, a pair of left and right lower rails 2 are provided with main body portions 2a made by a metal plate member and formed in a substantially upward-C shape, and a pair of left and right engagement portions 3 inward bent from front end sides of both of side portions 2b of the main body portions 2a and downward directed, thereby forming opening portions at end portions of the engagement portions 3. Further, front end rear end portions of the lower rail 2 are adhered to the vehicle body floor surface via front and rear leg portions 4a and 4b.

A pair of left and right upper rails 5 in the seat slide apparatus 1 are formed in a substantially inverse-T shape so as to be assembled in an inner portion of the lower rails 2, and engaged portions 7 are formed by both side portions 5b upward bent from front end sides of horizontal portions 5a in the upper rails 5. The engaged portions 7 are assembled so as to be capable of engaging with the engagement portions 3 in the side of the lower rails 2. Further, anchor members, shafts of a seat lifter, bases of a reclining mechanism and the like are mounted to substantially inverse-T shaped vertical portions 5a of the upper rails 5. A roller 9a is inserted between the lower rails 2 and the upper rails 5, and balls 9b are inserted between the engagement portions 3 and the engaged portions 7.

In the case that the lower rail 2 of the conventional seat slide apparatus 1 as mentioned above is formed long, it is complex to work the respective portions, and there is a problem of rattle in the respective portions due to a size error or the like. Further, there is a disadvantage that a weight is increased if it is intended to keep strength with respect to a load. Further, in the case that a peeling load is applied upward to the side of the upper rail 5 due to an impact load or the like, an upper portion of the lower rail 2 is opened, and there is a risk that the peeling strength is reduced. Further, in the case that the lower rail 2 is mounted to the side of the vehicle body floor surface, refuses on the floor surface drop down into the inner portion of the lower rail 2 from the opening portion of the lower rail 2, and there is a risk that a smooth sliding operation of the upper rail 5 can not be obtained. Further, it is impossible to suitably support a weight of a sitting person or the like and to obtain a simple and inexpensive structure.

SUMMARY OF THE INVENTION

The present invention is made by taking the problems mentioned above into consideration, and an object of the present invention is to provide a seat slide apparatus which can prevent an upper portion of a lower rail from opening so as to improve a peeling strength in the case that a peeling load is applied upward to a side of an upper rail due to an impact load or the like, can improve a strength of the lower rail so as to prevent the upper rail from deforming, can form an opening portion of the lower rail narrow so as to prevent refuses on a floor surface from dropping down into an inner portion of the lower rail from the opening portion of the lower rail, has a simple structure, requires no increase of a number of new parts and no additional operation, is inexpensive, can easily and rapidly execute a mounting operation, can obtain a smooth and stable sliding motion, and can reduce a sliding resistance so as to improve an operability.

According to a first aspect of the present invention, there is provided a seat slide apparatus comprising:

a lower rail mounted in a longitudinal direction of a seat mounting floor surface; and an upper rail guided and supported so as to freely slide in a longitudinal direction on the lower rail and mounted to a side of a seat main body, wherein the lower rail is provided with a main body portion formed in a substantially upward-C shape and a pair of right and left upper side portions extended inward from front end sides of both side portions in the main body portion so as to form an opening portion, slider receiving portions are formed in front end of both side portions in the main body portion, a first hook portion is formed in a front end portion in a side of the opening portion of the upper side portion, and second hook portions are formed in both side portions of the main body portion, and wherein the upper rail has a main body portion formed in a substantially downward-C shape capable of being assembled in the lower rail, and a vertical wall protruding upward from a center of an upper wall in the main body portion and protruding upward from the opening portion of the upper side portion in the lower rail, slider receiving portions are formed in upper ends of both side portions in the main body portion of the upper rail, a first engagement portion engaged with the first hook portion of the lower rail is formed in the upper wall of the main body portion, a projection portion is formed in the first engagement portion so as to protrude to the side of the first hook portion, and second engagement portions engaged with the second hook portions in the lower rail are formed in the side of the front ends of both side portions in the main body portion of the upper rail.

DETAILED DESCRIPTION OF THE PREFERRED EMBODIMENTS

A description will be in detail given below of a seat slide apparatus according to the present invention with reference to the accompanying drawings.

First Embodiment

A seat slide apparatus 11 is interposed between a seat main body (not shown) constituted on a vehicle body floor by a seat cushion, a seat back and the like, and the vehicle body floor surface, and is used for supporting the seat main body so as to freely slide in a longitudinal direction of the seat, as well known.

The seat slide apparatus 11 is provided with a lower rail 12 mounted on a seat mounting floor surface in a longitudinal direction, and an upper rail 13 guided and supported on the lower rail 12 so as to freely slide in a longitudinal direction and mounted to a side of a seat main body. Further, the lower rail 12 is arranged in a state of being buried in a notch portion 14a of a carpet 14 according to the first embodiment shown in FIG. 2. The seat slide apparatus 11 is formed from a light alloy such as an aluminum die cast, a magnesium alloy or the like according to an extrusion molding. In this case, the seat slide apparatus 11 may be a hard synthetic resin molded product.

Figure 2:
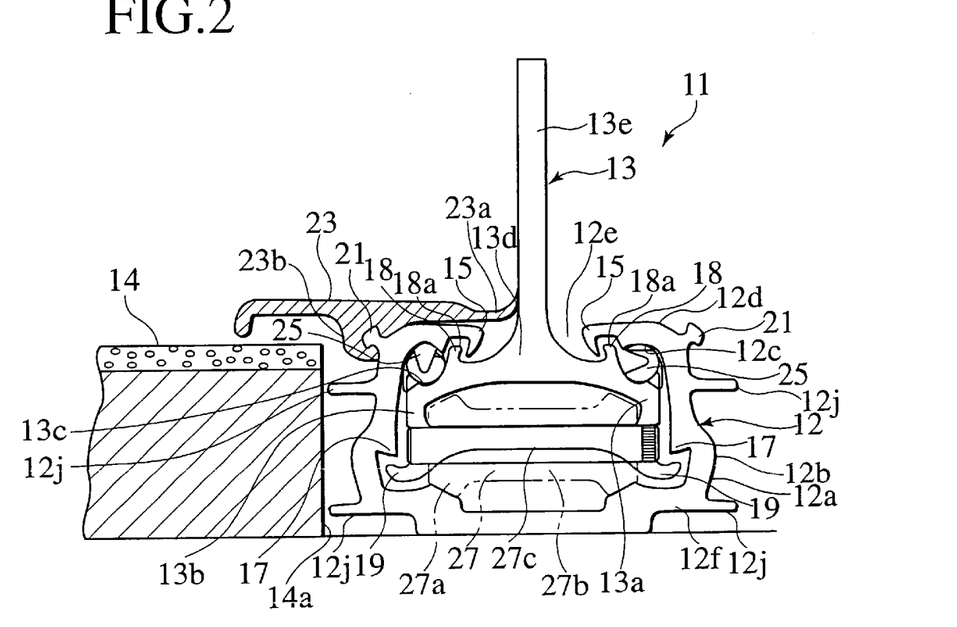
FIG. 2 is a cross sectional view of a main portion of a seat slide apparatus according to a first embodiment of the present invention.
Figure 5:
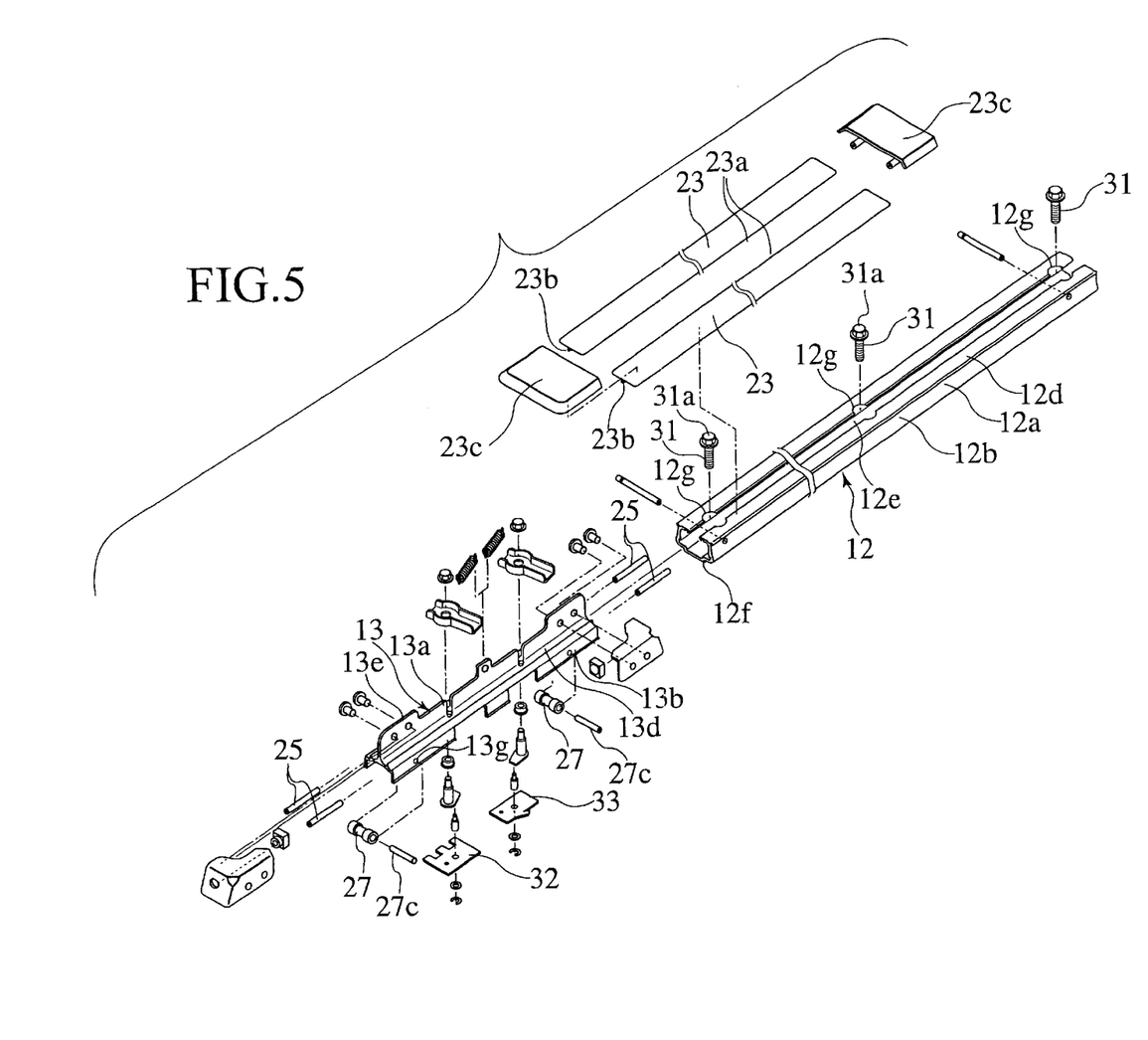
FIG. 5 is an exploded perspective view of the seat slide apparatus according to the first example of the present invention.

As shown in FIGS. 2 and 5, the lower rail 12 is provided with a main body portion 12a formed in a substantially upward-C shape, slider receiving portions 12c and 12c formed in inner sides of outer front ends of both side portions 12b and 12b in the main body portion 12a, and a pair of right and left upper side portions 12d and 12d extended by being bent inward from a front end side of both side portions 12b and 12b so as to form an opening portion 12e.

Roller receiving step portions 12f and 12f are formed in both sides of a bottom portion of the main body portion 12a. In this case, a shape of the bottom portion of the main body portion 12a is not limited to an illustrated one. Further, protruding portions 12j and 12j are vertically formed in outer sides of both side portions 12b and 12b, a lock hole is formed between the upper and lower protruding portions 12j and 12j, and a latch 32 of a lock mechanism inserted to and engaged with the lock hole and an interlock member 33 are provided so as not to interfere with a side portion of a notch portion 14a in a carpet 14.

As shown in FIGS. 2 and 5, the upper rail 13 has a main body portion 13a formed in a substantially downward-C shape so as to be assembled in an inner portion of the lower rail 12, slider receiving portions 13c and 13c formed in outer upper portions of both side portions 13b and 13b in the main body portion 13a, and a vertical wall 13e protruding upward from a center of upper walls 13d and 13d in the main body portion 13 and protruding upward from the opening portion 12e of the upper side portions 12d and 12d in the lower rail 12. In this case, the latch 32 corresponding to a lock mechanism and the interlock member 33 is provided between the upper rail 13 and the lower rail 12.

As shown in FIG. 2, a first hook portion 15 is formed at a front end portion in a side of the opening portion 12e of the main body portion 12a in the lower rail 12, and second hook portions 17 and 17 are formed in both side portions 12b and 12b in the main body portion 12a, respectively. The first hook portion 15 is formed along an edge portion of the opening portion 12e by inward bending a front end portion of the opening portion 12e in the upper side portions 12d and 12d. Further, finisher mounting portions 21 and 21 are formed near connecting portions between the upper ends of both side portions 12b and 12b in the lower rail 12 and a pair of right and left upper side portions 12d and 12d so as to protrude obliquely upward, and finishers 23 and 23 are mounted to the finisher mounting portion 21.

The finisher 23 is formed by a synthetic resin material, and a soft lip portion 23a is formed in an inner side thereof. Further, a finisher engagement portion 23b is formed in a back surface side of the finisher 23, and the finisher engagement portion 23b is engaged with the finisher mounting portion 21, whereby the lip portion 23a is brought into contact with a vertical wall 13e protruding upward from the opening portion 12e, and the opening portion 12e of the upper side portions 12d and 12d in the lower rail 12 is shielded. In this case, end caps 23c and 23c are mounted to front and rear end portions of the finisher 23 (refer to FIG. 5).

As shown in FIG. 2, a bottom wall 13f is formed in the main body portion 13a in the upper rail 13, and the bottom wall 13f is formed at a position where a roller 27, a lock mechanism and the other members do not exist. Right and left sides of the bottom wall 13f are downward bent.

First engagement portions 18 and 18 engaged with first hook portions 15 and 15 of the lower rail 12 are respectively formed in the upper walls 13d and 13d of the main body portion 13a in the upper rail 13. Projection portions 18a and 18a are formed in the first engagement portions 18 and 18 along a longitudinal direction of the main body portion 13a in the upper rail 13, and the projection portions 18a and 18a are formed so as to protrude to the side of the first hook portions 15 and 15.

The first engagement portions 18 and 18 engaged with the first hook portions 15 and 15 are formed so as to double as one sides of the slider receiving portions 13c and 13c formed in the outer upper portions of both side portions 13b and 13b in the upper rail 13.

Second engagement portions 19 and 19 engaged with second hook portions 17 and 17 in the lower rail 12 are respectively formed in front end sides of both side portions 13b and 13b of the main body portion 13a in the upper rail 13. The second engagement portions 19 and 19 are formed by outward bending curved portions in both right and left sides of the bottom wall 13f of the main body portion 13a in the upper rail 13 and lower ends of both side portions 13b and 13b in the main body portion 13a.

A slider 25 is inserted between the slider receiving portions 12c and 12c in the lower rail 12 and the slider receiving portions 13c and 13c in the upper rail 13, a roller 27 is inserted between the step portions 12f and 12f in the bottom portion of the main body portion 12a in the lower rail 12 and the upper walls 13d and 13d of the main body portion 13a in the upper rail 13. In this case, reference symbol 27c denotes a roller shaft.

Both side portions 27a and 27a of the roller 27 are formed so as to have a larger diameter than that of a center portion 27b, and both side portions 27a and 27a of the roller are mounted to the step portions 12f and 12f of the bottom portion of the main body portion in the lower rail 12, whereby it is possible to secure a wide space between the center portion 27b having a small diameter and the bottom portion of the main body portion 12a in the lower rail 12. Further, there is no risk that a head portion 31a of a bolt 31 is brought into contact with the roller 27 in the case that the lower rail 12 is fastened to the floor surface by a bolt 31.

In this case, a circular arc shaped notch portion 12g capable of inserting the head portion 31a of the bolt 31 therethrough is formed in each of the upper side portions 12d and 12d in the lower rail 12 in the side of the opening portion 12e, thereby easily fastening the lower rail 12 by the bolt 31.

Further, outer ends of both side portions 27a and 27a in the roller 27 are provided so as to be slidably brought into contact with or close to both side portions 13b and 13b of the main body portion 13a in the upper rail 13. In. the case that a tensile load is applied to the vertical wall 13e of the upper rail 13, it is possible to prevent both side portions 13b and 13b of the main body portion 13a in the upper rail 13 from being bent inward.

Figure 3:
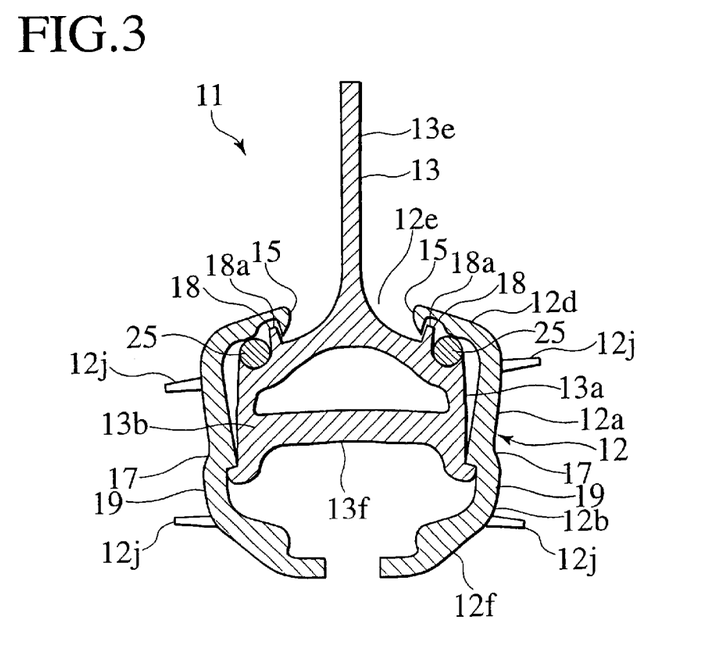
FIG. 3 is a cross sectional view of a state that a peeling load is applied to the seat slide apparatus according to the first example of the present invention.

According to the structure mentioned above, in the case that a peeling load is applied to the lower rail 12 and the upper rail 13 from a vertical direction, at first the first hook portions 15 and 15 and the first engagement portions 18 and 18 provided between both rails 12 and 13 are engaged, and in the case that the upper rail 13 is upward pulled up due to the deformation under the engagement state between the first hook portions 15 and 15 and the first engagement portions 18 and 18, the second hook portions 17 and 17 and the second engagement portions 19 and 19 are engaged, whereby it is possible to temporarily obtain a peeling preventing function.

Further, in the case that the peeling load is applied from a vertical direction, the first hook portions 15 and 15 and the projection portions 18a and 18a of the first engagement portions 18 and 18 are. engaged with each other, whereby it is possible to simply and securely obtain a peeling prevention in a desired state even when the peeling load is largely applied. In this case, the projection portions 18a and 18a may be intermittently provided or may be continuously provided to be long as a protrusion.

Figure 4:
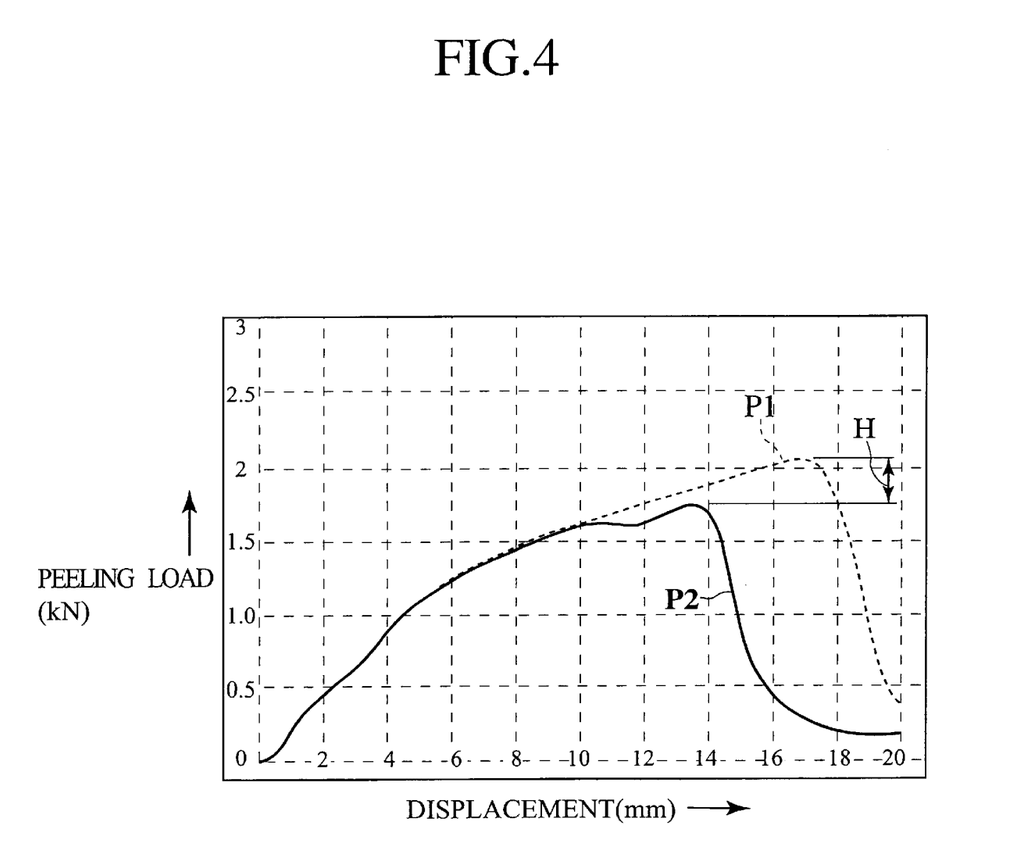
FIG. 4 is a graph showing a stress curve of the seat slide apparatus according to the first example of the present invention and a stress curve of a conventional seat slide apparatus in a comparative manner.

FIG. 4 shows a stress curve between a peeling load and a displacement by comparing the seat slide apparatus 11 according to the present invention with a conventional seat slide apparatus having no engagement portions 18 and 18 and no projection portions 18a and 18a. It is known that the seat slide apparatus 11 according to the present invention can stand against a peeling load a peeling load H higher than the convention seat slide apparatus by comparing a stress curve P1 of the seat slide apparatus 11 according to the present invention with a stress curve P2 of the conventional seat slide apparatus.

Second Embodiment

Figure 6:
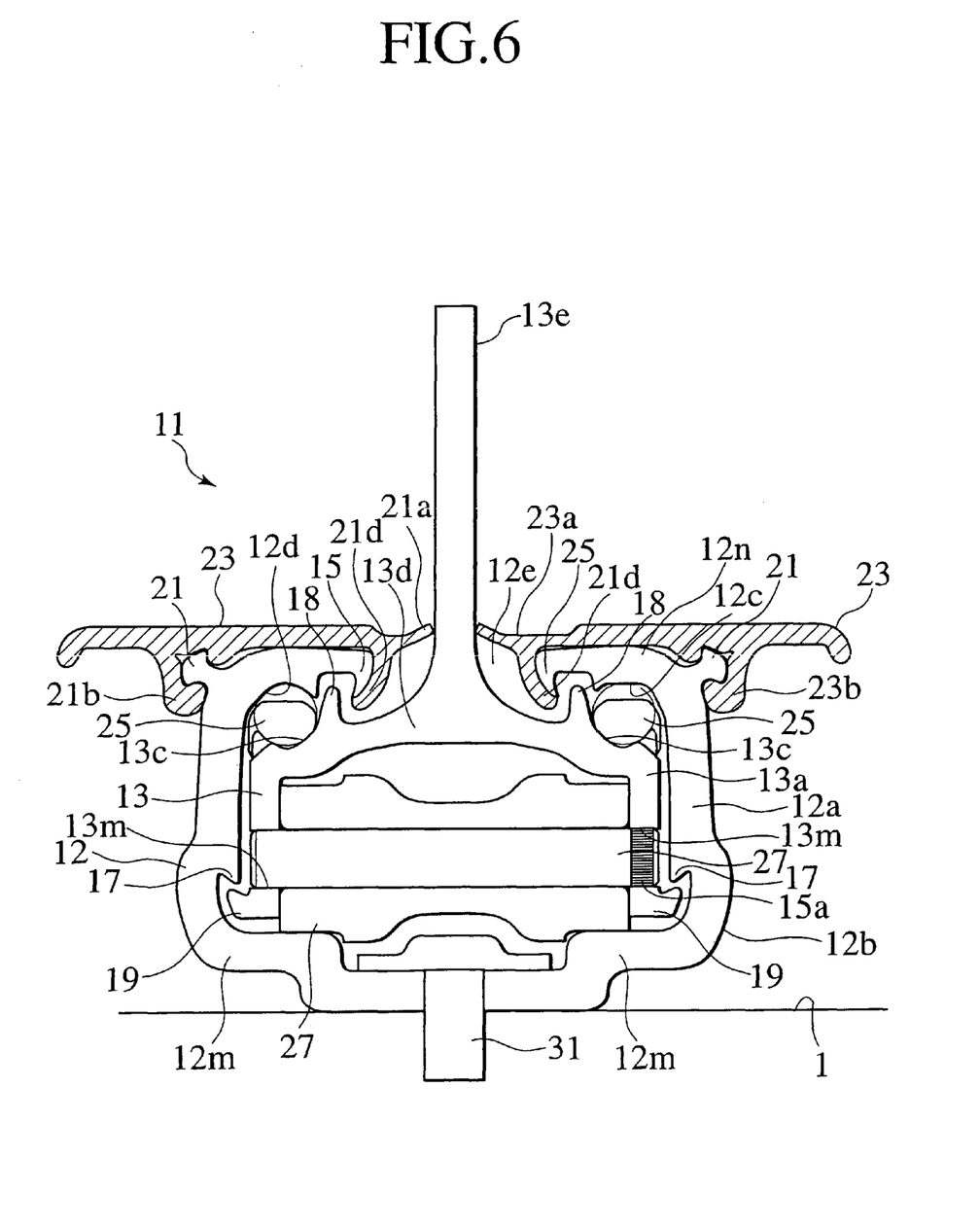
FIG. 6 is a cross sectional view showing a structure of a seat slide apparatus according to a second example of the present invention.
Figure 7:
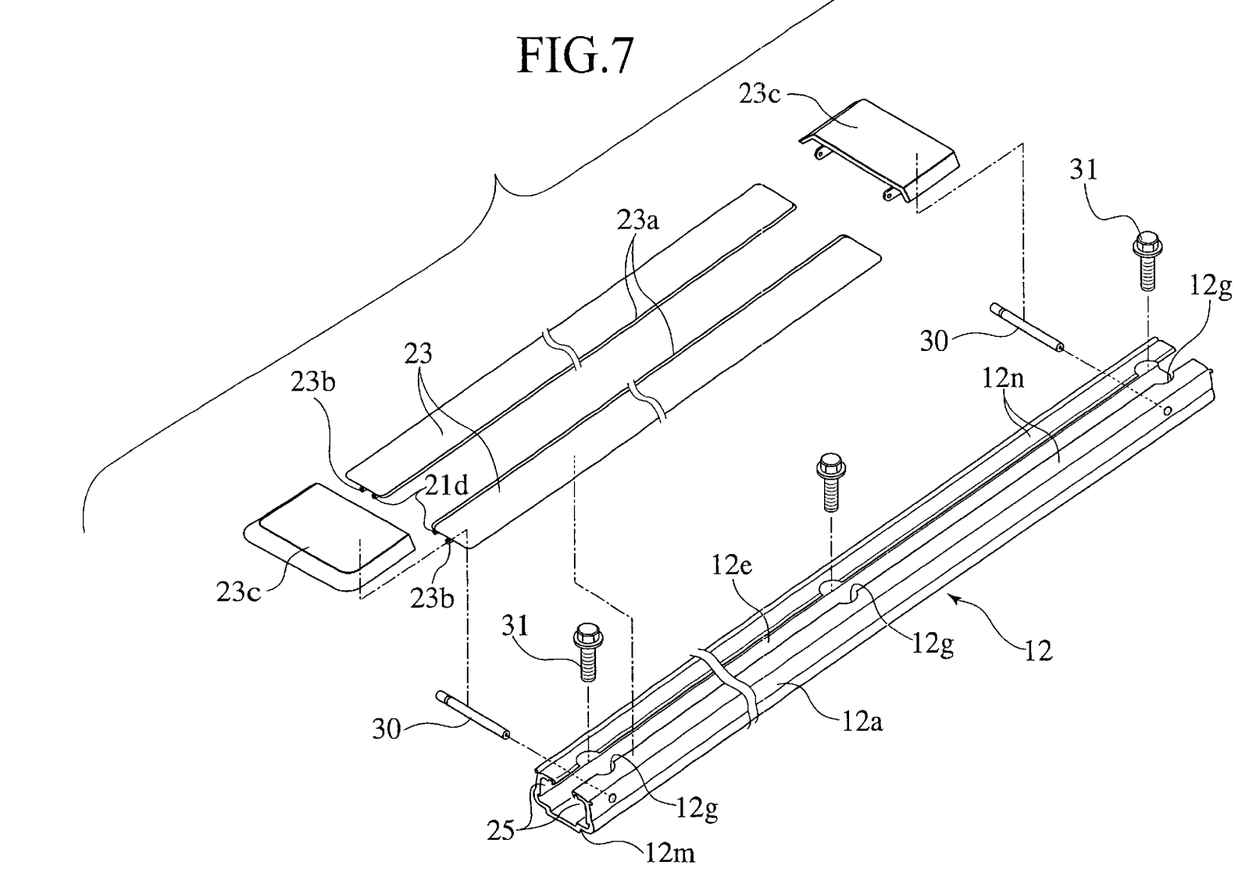
FIG. 7 is an exploded perspective view of a lower rail in the seat slide apparatus according to the second example of the present invention.

A description will be in detail given below of a second embodiment of the present invention with reference to FIGS. 6 and 7. FIG. 6 is a cross sectional view showing a second embodiment according to the present invention, and FIG. 7 is an exploded perspective view of a lower rail according to the second embodiment. In this case, the same reference numerals are attached to the corresponding elements to those in FIGS. 2 and 5.

A seat slide apparatus 11 is provided with a lower rail 12 extending along a longitudinal direction of a vehicle body floor surface 1, and an upper rail 13 guided and supported on the lower rail 12 so as to freely slide in a longitudinal direction and mounted and fixed to a side of a seat main body. The lower rail 12 is adhered to the vehicle body floor surface 1 by a bolt 31 or the like.

The lower rail 12 and the upper rail 13 of the seat slide apparatus 11 are formed by an extrusion molded product of a light alloy such as an aluminum die cast, a magnesium alloy or the like. In this case, the lower rail 12 and the upper rail 13 in the seat slide apparatus 11 may be a hard 13 synthetic resin molded product.

As shown in FIGS. 6 and 7, the lower rail 12 is provided with a main body portion 12a formed in a substantially upward-C shape, and a pair of right and left flanges 12n inward extended from front ends of both sides of the main body portion 12a so as to form an opening portion 12e. Further, slider receiving portions 12c and 12c are formed on inner surfaces of upper side corner portions in the main body portion 12a, and roller receiving step portions 12m are formed in both sides of a bottom portion in the main body portion 12a. Further, inward bent hook portions 15 are formed in front ends of the flanges 12n in the lower rail 12, and second hook portions 17 are formed in both side portions of the main body portion 12a.

Next, as shown in FIG. 6, the upper rail 13 has a main body portion 13a formed in a substantially downward-C shape so as to be assembled in the lower rail 12, and a vertical wall 13e protruding upward from a center of upper walls 13d in the main body portion 13a and extending upward through the opening portion 12b in the lower rail 12.

Further, slider receiving portions 13c respectively receiving sliders 25 are provided in the upper walls 13d. Further, the sliders 25 mounted on the slider receiving portions 13c in the upper rail 13 are brought into contact with lower surfaces of the slider receiving portions 12m in the lower rail 12. In this case, one slider receiving portion 12m is formed so as to be substantially linear in a horizontal direction, and formed so as to be capable of sliding in a lateral direction and absorbing a size error.

Further, first engagement portions 18 are formed at positions close to the side of the vertical wall 13e from the slider receiving portions 13c of the upper walls 13d so as to protrude upward, and the first engagement portions 18 are engaged with the first hook portions 15 at the front ends of the flanges 12c in the lower rail 12 at a time when an upward load is applied to the upper rail 13. Second engagement portions 19 are provided in both sides of the upper rail 13, and the engagement portions 19 are engaged with the second hook portions 17 in the lower rail 12.

Roller shafts 27c are mounted to axial holes 13m provided in front and rear end sides of the main body portion 13a in the upper rail 13 so that the upper rail 13 can smoothly slide on the lower rail 12, and a roller 27 is pivoted to the roller shafts 27c. In this case, a serration 15a is formed in one end of the roller shaft 15, and the serration 15a is pressure inserted to the axial hole 13m of the main body portion 13a in the upper rail 13. Further, in FIG. 7, reference numeral 30 denotes a stopper shaft for stopping the upper rail 13 provided in front of and at the rear of the lower rail 12.

A pair of right an left finishers 23 constituted by a synthetic resin molded product are mounted on the upper surface of the main body portion 12a in the lower rail 12, that is, the flanges 12n, and end caps 23c covering front and rear side terminals of the finishers 23 are respectively attached to the front and rear end sides of the lower rail 12. Finisher mounting portions 21 are respectively formed so as to protrude upward from right and left corner portions of the upper portion in the lower rail 12, and finisher engagement portions 23b respectively formed in back surface sides of a pair of right and left finishers 23 are engaged with the right and left finisher mounting portions 21.

Further, engagement portions 21d engaged with the front ends of the flanges 12n in the lower rail 12 are respectively formed in mutually opposing sides of the right and left finishers 23. The engagement portions 21d are formed so as to protrude downward from base end sides of lip portions 21a, and are formed so as to correspond to curves of the engagement portions 25 at the front ends of the flanges 12n.

In this case, the opening portion 12b of the lower rail 12 is set to be narrow so as to prevent foreign materials such as dusts, refuses and the like from entering from the external portion, and a large diameter portion 12i for passing the bolt 31 therethrough is formed so as to correspond to the mounting portion of the bolt 31. Further, lip portions 23a opposing to each other are provided in inner edge portions of a pair of right and left finishers 23, however, the lip portions 23a may be omitted.

In this case, the present invention is not limited to the structures according to the embodiments mentioned above, it is free to suitably modify and change the shape, the structure and the like of the respective portions in the seat slide apparatus, and various modified embodiments including the shape and the material of the respective rails as mentioned above can be considered.

What is claimed is:

1. A seat slide apparatus comprising:
a lower rail mounted in a longitudinal direction of a seat mounting floor surface; and
an upper rail guided and supported so as to freely slide in a longitudinal direction on the lower rail and mounted to a side of a seat main body, wherein
the lower rail having a main body portion formed in a substantially upward-C shape and a pair of right and left upper side portions extended inward from front end sides of both side portions in the main body portion so as to form an opening portion;
slider receiving portions being formed in front ends of both side portions in the main body portion, a first hook portion being formed in a front end portion in a side of the opening portion of the upper side portion, and second hook portions being formed in both side portions of the main body portion;
the upper rail having a main body portion formed in a substantially downward-C shape capable of being assembled in the lower rail, and
a vertical wall protruding upward from a center of an upper wall in the main body portion and protruding upward from the opening portion of the upper side portion in the lower rail;
slider receiving portions being formed in upper ends of both side portions in the main body portion of the upper rail, a first engagement portion engaged with the first hook portion of the lower rail being formed in the upper wall of the main body portion in the upper rail, a projection portion being formed in the first engagement portion so as to protrude to the side of the first hook portion, and a second engagement portion engaged with the second hook portion in the lower rail being formed in the side of the front ends of both side portions in the main body portion of the upper rail.

2. A seat slide apparatus as claimed in claim 1, wherein an opening portion capable of inserting ahead portion of a bolt for fixing the lower rail therethrough is provided in the opening portion of the upper side portion in the lower rail.

3. A seat slide apparatus comprising:
a lower rail mounted in a longitudinal direction of a seat mounting floor surface; and
an upper rail guided and supported so as to freely slide in a longitudinal direction on the lower rail and mounted to a side of a seat main body, wherein
the lower rail having a main body portion formed in a substantially upward-C shape and a pair of right and left upper side portions extended inward from front end sides of both side portions in the main body portion so as to form an opening portion;
slider receiving portions being formed in front ends of both side portions in the main body portion, a first hook portion being formed in a front end portion in a side of the opening portion of the upper side portion, second hook portions being formed in both side portions of the main body portion, the first hook portion being formed along an edge portion of the opening portion by inward bending a front end portion in a side of,the opening portion of the upper side portion;
the upper rail having a main body portion formed in a substantially downward-C shape capable of being assembled in the lower rail, and
a vertical wall protruding upward from a center of an upper wall in the main body portion and protruding upward from the opening portion of the upper side portion in the lower rail;
slider receiving portions being formed in upper ends of both side portions in the main body portion of the upper rail, a first engagement portion engaged with the first hook portion of the lower rail being formed in the upper wall of the main body portion, a projection portion being formed in the first engagement portion so as to protrude to the side of the first hook portion, a second engagement portion engaged with the second hook portion in the lower rail being formed in the side of the front ends of both side portions in the main body portion of the upper rail, and the first engagement portion engaged with the first hook portion in the lower rail being formed so as to double as one side of the slider receiving portions at the upper ends of both side portions of the main body portion in the upper rail.

4. A seat slide apparatus comprising:
a lower rail mounted in a longitudinal direction of a seat mounting floor surface; and
an upper rail guided and supported so as to freely slide in a longitudinal direction on the lower rail and mounted to a side of a seat main body, wherein
the lower rail being provided with a main body portion formed in a substantially upward-C shape and a pair of right and left upper side portions extended inward from front end sides of both side portions in the main body portion so as to form an opening portion, slider receiving portions being formed in front ends of both side portions in the main body portion, a first hook portion being formed in a front end portion in a side of the opening portion of the upper side portion, second hook portions being formed in both side portions of the main body portion, the first hook portion being formed along an edge portion of the opening portion by inward bending a front end portion in a side of the opening portion of the upper side portion;

the upper rail having a main body portion formed in a substantially downward-C shape capable of being assembled in the lower rail, and a vertical wall protruding upward from a center of an upper wall in the main body portion and protruding upward from the opening portion of the upper side portion in the lower rail, slider receiving portions being formed in upper ends of both side portions in the main body portion of the upper rail, a first engagement portion engaged with the first hook portion of the lower rail being formed in the upper wall of the main body portion, a projection portion being formed in the first engagement portion so as to protrude to the'side of the first hook portion, and a second engagement portion engaged with the second hook portion in the lower rail being formed in the side of the front ends of both side portions in the main body portion of the upper rail; and sliders being inserted between the slider receiving portions in the lower rail and the slider receiving portions in the upper rail, and rollers being inserted between the bottom portions of the main body portion in the lower rail and the upper walls of the main body portion in the upper rail.

5. A seat slide apparatus as claimed in claim 4, wherein finisher mounting portions are respectively formed so as to protrude upward from right and left corner portions of the upper portion in the lower rail, and the finisher engagement portions respectively formed in sides of back surfaces of a pair of right and left finishers are engaged with the right and left finisher mounting portions.

6. A seat slide apparatus as claimed in claim 5, wherein lip portions are formed in inner sides of the finishers, and the lip portions are brought into contact with the vertical wall so as to cover the opening portions.

7. A seat slide apparatus as claimed in claim 5, wherein engagement portions are provided on back surface sides of the finishers, and the engagement portions are engaged with the lower rail mounting portions.

8. A seat slide apparatus as claimed in claim 4, wherein the roller is formed by a center portion and both side portions having a larger diameter than that of the center portion, and a space portion is secured between the bottom portion of the main body portion in the lower rail and the center portion.

9. A seat slide apparatus comprising:

a lower rail mounted to a side of a vehicle body floor surface; and an upper rail guided and supported so as to freely slide in a longitudinal direction on the lower rail and mounted and fixed to,a side of a seat main body, wherein the lower rail having a main body portion formed in a substantially upward-C shape and a pair of right and left flanges extended inward from front end sides of both side portions in the main body portion so as to form an opening portion;

the upper rail having a main body portion formed in a substantially downward-C shape capable of being mounted to the lower rail, and a vertical wall protruding upward from a center of an upper wall in the main body portion and protruding upward from the opening portion in the lower rail; and finisher mounting portions being respectively formed so as to protrude upward from right and left corner portions of the upper portion in the lower rail, finisher engagement portions respectively formed in sides of back surfaces of a pair of right and left finishers being engaged with the right and left finisher mounting portions, and engagement portions engaged with the lower rail being respectively formed in mutually opposing sides of the right and left finishers.

10. A seat slide apparatus as claimed in claim 9, wherein the engagement portions are respectively engaged with front ends of a pair of left and right flanges in the lower rail.

11. A seat slide apparatus as claimed in claim 9, wherein lip portions brought into contact with the vertical wall of the upper rail are formed in the mutually opposing sides of the right and left finishers, and the engagement portions are respectively formed so as to protrude downward from base end sides of the lip portion.

12. A seat slide apparatus as claimed in claim 9, wherein an opening portion capable of inserting ahead portion of a bolt for fixing the lower rail therethrough is provided in the opening portion of the upper side portion in the lower rail.

13. A seat slide apparatus as claimed in claim 9, comprising the lower rail having slider receiving portions provided on inner surfaces of the upper corner portions in the main body portion, first hook portions provided in the front end portions of the flanges, and second hook portions provided in both side portions of the main body portion; and the upper rail having first engagement portions, slider receiving portions provided in the upper walls of the main body in the upper rail, and second engagement portions provided in both side portions of the main body portion, wherein the first engagement portions are engaged with the first hook portions, and the second engagement portions are engaged with the second hook portions.

* * * * *